United States Patent [19]

Takahashi

[11] Patent Number: 4,588,265
[45] Date of Patent: May 13, 1986

[54] TELECENTRIC REAR CONVERTER
[75] Inventor: Tomowaki Takahashi, Tokyo, Japan
[73] Assignee: Nippon Kogaku K. K., Tokyo, Japan
[21] Appl. No.: 447,932
[22] Filed: Dec. 6, 1982
[30] Foreign Application Priority Data
  Dec. 14, 1981 [JP] Japan .................. 56-201362
[51] Int. Cl.⁴ ............................................ G02B 13/22
[52] U.S. Cl. .................................... 350/415; 350/453
[58] Field of Search ............... 350/415, 463, 422, 453, 350/559

[56] References Cited
U.S. PATENT DOCUMENTS 3,572,886  3/1971  Curtiss et al. ........................ 350/559
4,154,508  5/1979  Nakamura ........................... 350/183
4,365,871  12/1982 Muchel ................................ 350/422

Primary Examiner—John K. Corbin
Assistant Examiner—P. M. Dzierzynski
Attorney, Agent, or Firm—Shapiro and Shapiro

[57] ABSTRACT

A telecentric rear converter mountable on the image side of an objective lens to enlarge the composite focal length of the rear converter and the objective lens more greatly than the focal length of the objective lens includes a first lens group of negative refractive power and a second lens group of positive refractive power disposed on the image side of the first lens group. The two lens groups are disposed so that the spacing between the principal points thereof is substantially equal to the difference between the respective absolute values of the focal lengths of the two lens groups. When the telecentric rear converter is mounted on the image side of the objective lens, the rearward focus of the first lens group is substantially coincident with the image point by the objective lens and converts the convergent light beam by the objective lens into a substantially parallel light beam, and the second lens group maintains its telecentricity while securing a predetermined back focal length.

22 Claims, 21 Drawing Figures

TELECENTRIC REAR CONVERTER

BACKGROUND OF THE INVENTION

1. Field of the Invention

This invention relates to a rear converter mounted on the image side of an objective lens to enlarge the composite focal length, and in particular to a rear converter mounted on a telecentric objective lens to maintain the telecentricity of the emergent light beam.

2. Description of the Prior Art

A conversion lens is used chiefly to change the focal length range of an objective lens. A conversion lens mounted on the front side of an objective lens to shift the focal length range to the long focus side is called a front teleconverter, and a conversion lens mounted on the rear side of an objective lens is called a rear teleconverter. These two systems have their own merits and demerits, and the rear converter is often used because it can be made very compact and light-weight. The principle of a popular rear converter, as shown in FIG. 1 of the accompanying drawings, is that a converter C as a lens system having a negative power is added to the rear side of an objective lens L and is caused to function to convert the focal length as a whole into the long focal length side and maintain the imaging performance. In that case, it is usual that the inclination of the principal ray of the oblique light beam having passed through the objective lens L is further inclined by the action of the negative power of the converter C after the light beam passes through the converter C, and the exit pupil comes nearer to the image side.

In a camera which records images by means of an ordinary silver salt photosensitive material, even if this principal ray of the oblique light beam enters the photosensitive surface while being considerably inclined, it does not affect the quality of image and therefore, it is rather usual to cause the principal ray to enter while being inclined for the purpose of making the optical system compact or making the portion connected to the camera body compact. However, in case images are recorded by means of an image pickup tube or element for video, there are a low-pass filter, a stripe filter, etc. before the light beam passes through the lens reaches the photoelectric surface, and particularly, the spacing between the stripe filter and the photoelectric surface has a thickness of the order of 20–50$\mu$ and therefore, if the light beam enters obliquely, it may cause poor synchronization of electrical signals and unclear images. Particularly, in the case of a color stripe filter used in a color video camera, if the light beam enters with an inclination, it will sensitize a location deviated from a predetermined photosensitive zone after having passed through the color stripe filter and may cause occurrence of color misregistration and aggravation of the quality of image. Therefore, generally, in the optical system for a video camera, there is adopted an optical system through which the principal ray of the oblique light beam enters the photosensitive surface nearly perpendicularly thereto, that is, a telecentric optical system.

Again in the telecentric optical system used in such a lens for a video camera, if there is a rear converter, the application thereof will conveniently become wider. For example, if a rear converter of 2 magnifications is mounted on a zoom lens of 10 zoom ratio (f=10–100 mm), the focal length will become 20 mm–200 mm and will generally cover a focal length range twenty times, and this will mean a tremendous power. Moreover, the size of the converter itself is very small and handy as compared with the body lens. However, where a rear converter is used for video, there is another problem. The rear converter which adds a negative power to the rear side of the objective lens as previously described displaces the incident light beam as shown in FIG. 1 and thus deviates from the telecentricity which is important for the optical system for video. This is considered to be a matter of basic principle, and a rear converter which changes the focal length while maintaining its telecentricity has been regarded as impossible. Thus, heretofore, it has been given up to mount a rear converter on a telecentric optical system for video and large front converters have been used, or the deviation from the telecentricity has been regarded as inevitable and small rear converters have been used with a result that aggravation of images and occurrence of color misregistation have been unavoidably tolerated.

SUMMARY OF THE INVENTION

In view of such situations, the present invention intends to provide a rear converter which can vary the focal length of an objective lens without destroying the telecentricity of the objective lens and moreover can maintain an excellent imaging performance even if mounted on a bright objective lens.

The invention will become fully apparent from the following detailed description thereof taken in conjunction with the accompanying drawings.

DESCRIPTION OF THE PREFERRED EMBODIMENTS

Figure 2:
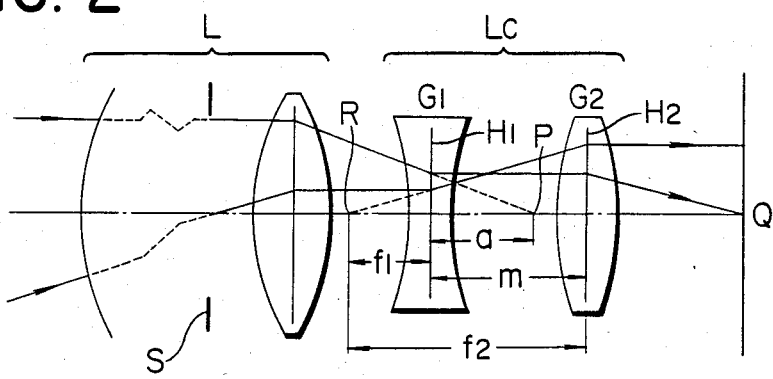
FIG. 2 is a basic construction view illustrating the principle of the present invention.

The principle of a telecentric rear converter according to the present invention, as shown in FIG. 2 which illustrates the basic construction, is that the telecentric rear converter has an object side first lens group or unit $G_1$ having a negative refractive power and an image side second lens group or unit $G_2$ having a positive refractive power, the two lens groups are disposed so that the spacing between the principal points of the two lens groups is substantially equal to the difference between the absolute values of the focal lengths of the two lens groups, the rear converter is mounted on a telecentric objective lens L so that the rearward focus of the first lens group $G_1$ is substantially coincident with the image point P by the telecentric objective lens L, the convergent light beam by the objective lens L is converted into a substantially parallel light beam by the first lens group $G_1$ and this light beam is imaged with its telecentricity maintained while securing a predetermined back focal length by the second lens group $G_2$.

Assuming that with respect to the image point P by the objective lens L and from the conjugate relation about the first lens group $G_1$, the focal length of the first lens group $G_1$ is $f_1$ and the distance from the principal point $H_1$ of the first lens group to the image point P is a and the distance from the principal point $H_1$ to a point conjugate with the image point P is b, there is established:

$$\frac{1}{a} + \frac{1}{b} = -\frac{1}{f_1}$$

Here, $$|f_1| \approx a \tag{1}$$

whereby $b_1 \approx \infty$ and the emergent light from the first lens group $G_1$ can be made into a substantially parallel light beam. This parallel light beam may be converged by the second lens group $G_2$ of positive refractive power, and if the focal length of the second lens group $G_2$ is $f_2$ and the spacing between the principal points of the first and second lens groups is m, it is necessary that $$m \approx f_2 - |f_1| \tag{2}$$

in order that telecentricity may be maintained. That is, since the objective lens L is telecentric, the image of the stop S in the objective lens is formed substantially at infinity and a point R conjugate with the stop S by the first lens group $G_1$ is positioned near the forward focus of the first lens group $G_1$. The position of this conjugate point R is substantially coincident with the position of the forward focus of the second lens group $G_2$ from the condition of formula (2) regarding the second lens group $G_2$ and thus, the image of the stop S is again formed at the infinity position. This is nothing but a telecentric system.

Here, the lateral magnification $\beta$ as a rear converter is $$\beta \approx f_2/|f_1| \tag{3}$$

and assuming that the focal length of the objective lens L is f, the composite focal length F of the entire system is expressed as:

$$F = f \cdot \beta \tag{4}$$

Due to the basic construction as described above, the telecentric light beam of the objective lens maintains its telecentricity even after it passes through the rear converter and moreover, the image of the imaging point P by the objective lens can be formed at a point Q while being enlarged $\beta$ times by the function of the rear converter and thus, a rear converter practically excellent as a the rear converter of an optical system for a video camera can be realized.

Now, the degree of freedom of such a construction is very small and is $\beta$ is determined as the necessary magnification, $f_1$ only is left as the degree of freedom. That is, if $f_1$ is determined, $f_2$ is determined by formula (3) and a and m are determined by formulas (1) and (2). The range of $f_1$ cannot be secured widely but is limited by the Bf of the optical system of the body and the Petzval sum of the converter. Assuming that the apparent refractive indices of the first lens group $G_1$ and the second lens group $G_2$ are $N_1$ and $N_2$, respectively, the value of the Petzval sum Pc of the converter is expressed as $$Pc = \frac{1}{f_1 N_1} + \frac{1}{f_2 N_2}$$

and usually assumes a negative value. This may cause the image plane to be curved and therefore, a value as approximate to zero as possible is required. For that purpose, $|f_1|$ must be as great a value as possible, but it is limited by its relation with the image point by the objective lens from formula (1). Also, actually, such a degree of air space that the objective lens L and the first lens group $G_1$ are not in contact with each other is necessary. Even if this air space is small, the value of $|f_1|$ can be selected to a substantially great value by adopting such a lens configuration that the forward principal point of the first lens group $G_1$ is as forward as possible, but as regards the first lens group, the adoption of such a configuration would cause occurrence of excessive aberrations which could not be corrected.

Therefore, in the basic construction as described above, it is desirable that the telecentric rear converter according to the present invention further have the following construction. That is, when the spacing between the principal points of the first lens group $G_1$ and the second lens group $G_2$, more particularly the spacing between the rearward principal point of the first lens group $G_1$ and the forward principal point of the second lens group $G_2$, is m and the distance between the image point by the objective lens L when the rear converter Lc has been mounted on the objective lens and the principal point of the first lens group $G_1$, more particularly, the forward principal point thereof, is a and the magnification as the rear converter is $\beta$, it is desirable that the telecentric rear converter according to the present invention satisfy the following conditions:

$$0.7 < \frac{a}{|f_1|} < 1.2 \tag{5}$$

$$0.7 < \frac{f_2}{m + |f_1|} < 1.5 \tag{6}$$

$$0.8\beta < \frac{f_2}{|f_1|} < 1.4\beta \tag{7}$$

Condition (5) above concerns the focal length of the first lens group for substantially achieving the basic construction of formula (1) and the distance to the image point of the objective lens when the rear converter is mounted on the objective lens, namely, the object point as viewed from the rear converter, and prescribes the connection relation between the objective lens and the rear converter. If the upper limit of this condition is exceeded, the diverging action by the first lens group will become too strong and correction of the aberrations of the first lens group will become difficult and it will be impossible to provide for a simple lens construction and the back focal length will become greater than necessary and thus, the entire system will become bulky.

On the other hand, if the lower limit of this condition is exceeded, the refractive power of the first lens group $G_1$ will become too small or the distance between the first lens group and the objective lens will become too small and it will become difficult to secure a sufficient back focal length when the rear converter is mounted thereto.

Condition (6) is for practically achieving the basic arrangement relation between the first lens group and the second lens group as defined by formula (2). If the lower limit of this condition is exceeded, the light beam emergent from the rear converter will become rather convergent than telecentric and on the other hand, the spacing between the first lens group and the second lens group will become too great and thus, not only the rear converter itself will become bulky but also the effective aperture of the second lens group will become greater, so that correction of aberrations will become difficult. If the lower limit of this condition is exceeded, the light beam emergent from the rear converter will become rather convergent than telecentric and, if the upper limit of this condition is exceeded, the divergent state will become remarkable. In any case, color misregistration in the image pickup plane will become liable to occur.

The power arrangements of the first lens group and the second lens group are substantially defined by these conditions (5) and (6), and it is desirable that the power arrangements of the two lens groups for obtaining a predetermined magnification $\beta$ as the rear converter be defined in the range of condition (7), and good correction of various aberrations can be accomplished with each group being made into the simplest construction.

As regards the magnification $\beta$ as the rear converter, the order of 1.2-2.0 is practical, but in the case of any magnification, in what positional relation the rear converter is mounted relative to the objective lens, that is, the position of the image point by the objective lens relative to the rearward focus of the first lens group of the rear converter, is a great problem as described in connection with formulas (1) and (5), and this point will hereinafter be discussed rather in detail.

Where the focal length $f_1$ of the first lens group and the distance a between the image point by the objective lens and the rearward focus of the first lens group are $f_1 \approx a$ as shown as the basic construction in formula (1), the emergent light from the objective lens is made into a substantially parallel light beam by the first lens group $G_1$ and therefore, the spacing m between the principal points of the first and second lens groups can be made considerably great and the position of the second lens group has a considerable degree of freedom in securing a predetermined back focal length. Therefore, the arrangement of the second lens group may be determined so that the telecentricity chiefly in the final image plane can be maintained. Even if the first lens group and the second lens group are moved in the direction of the optical axis, fluctuation of aberrations is small, and this is also advantageous in effecting very close photography or so-called macro-photography by temporally moving one of these lens groups.

Where $|f_1|<a$, that is, the imaging point P of the objective lens lies rearwardly of the rearward focus of the first lens group, the light beam emergent from the first lens group becomes rather divergent and thus passes through the marginal portion of the second lens group and therefore, the second lens group becomes bulky and a bright lens becomes necessary. Also, the distance between the second lens group and the final imaging point Q, namely, the back focal length, becomes greater than the focal length $f_2$ of the second lens group and therefore, if the upper limits of conditions (5) and (6) are exceeded, the lens system will become bulkier than necessary. The burden of aberration correction of the first lens group also becomes great and it is therefore desirable that as far as the back focal length of the objective lens permits within the range of formula (5), the absolute value $|f_1|$ of the focal length of the first lens group be made great to reduce the burden of aberration correction thereof.

On the other hand, where $|f_1|>a$, that is, the imaging point P of the objective lens lies forwardly of the rearward focus of the first lens group, the light beam emergent from the first lens group becomes rather convergent. In the rear converter according to the present invention, the spacing m between the principal points of the first and second lens groups is basically $m \approx f_2 - |f_1|$ as shown by formula (2) and, if a rear converter whose magnification $\beta$ is of the order of 2 is taken as an example, $m \approx |f_1|$. This value of m is a very great value as compared with the conventional rear converter whose magnification $\beta$ is of the order of 2.0. If, in such a construction, the light beam emergent from the first lens group becomes rather convergent, the position of the light beam reaching the second lens group will excessively concentrate upon the central portion and extremely, it may possibly form a real image before it reaches the second lens group. Actually, this is impossible, but if the lower limits of conditions (5) and (6) are exceeded, the distance between the second lens group and the final imaging point, namely, the back focal length will become too small and this will prevent a low-pass filter or the like necessary as an objective lens for a video camera from being inserted and when it is desired to connect two identical converters, a back focal length sufficient to couple them together cannot be maintained and the connection will become impossible. In this case, however, the refractive power of the first lens group will become relatively small and the burden of aberration correction of the first lens group will be reduced and therefore, it will be effective to make the emergent light beam from the first lens group somewhat convergent within the range of the condition.

Description will now be made of the specific lens construction of each lens group. The first lens group $G_1$ is basically required to be of a negative meniscus shape convex toward the object side in order to make the convergent light beam from the objective lens into a substantially parallel light beam without causing spherical aberration to occur as much as possible. A cemented surface is indispensable for the correction of chromatic aberration, and it is desirable that the first lens group comprise, in succession from the object side, a negative meniscus lens $L_{11}$ convex toward the object side, a positive lens $L_{12}$ having its surface of sharper curvature facing the object side, and a negative lens $L_{13}$ having its surface of sharper curvature facing the image side. It is possible to correct spherical aberration and coma better by separating a part or the whole of the cemented surfaces of the cemented lens comprising these three lenses. When the shape factors of the negative meniscus lens $L_{11}$, the positive lens $L_{12}$ and the negative lens $L_{13}$ forming the first lens group $G_1$ are $q_{11}$, $q_{12}$ and $q_{13}$, respectively, it is desirable to satisfy the following conditions:

$$1.5 < -q_{11} < 4.5 \quad (8)$$

$$0.2 < q_{12} < 3.0 \quad (9)$$

$$0 < -q_{13} < 3.5 \quad (10)$$

When the radius of curvature of the lens surface adjacent to the object side is $r_a$ and the radius of curvature of the lens surface adjacent to the image side is $r_b$, it is is to be understood that the shape factor q of each lens is defined as $$q = \frac{r_b + r_a}{r_b - r_a}$$

In these conditions, where the cemented surfaces in the first lens group are separated, it is desirable in order to better correct the differences in high order spherical aberration and coma by the angle of view that the following conditions be satisfied:

$$0.2 < q_{12} < 0.6 \quad (9')$$

$$0 < -q_{13} < 0.6 \quad (10')$$

As regards the second lens group $G_2$, the oblique light beam diverged by the first lens group $G_1$ passes through the marginal portion of the second lens group and therefore, the effective aperture of the second lens group becomes great and in particular, the aberration correction in the marginal portion is a great problem. That is, the oblique light beam must be converged while maintaining its telecentricity so that astigmatism and coma may not occur as much as possible. It is therefore necessary that the second lens group be of a construction in which the lens surface of diverging function is disposed on the object side and the lens surface of converging function is disposed on the image side although some spherical aberration would occur. The simplest construction therefor is a positive meniscus lens convex toward the image side, but for the correction of chromatic aberration, astigmatism and spherical aberration, the second lens group may be of a two-lens construction comprising a negative lens and a positive lens separate from each other, and more particularly, it is desirable that the second lens group comprise, in succession from the object side, a negative meniscus lens $L_{21}$ convex toward the object side and a positive lens $L_{22}$ having its surface of sharper curvature facing the image side. Between these two lenses, there is formed an air lens of a positive meniscus shape convex toward the object side, namely, of a diverging property, whereby the astigmatism and coma in the marginal portion can be well corrected and also the spherical aberration occurring in the subsequent positive lens can be well corrected. Accordingly, when the shape factors of the negative meniscus lens $L_{21}$ and the positive lens $L_{22}$ forming the second lens group are $q_{21}$ and $q_{22}$, respectively, it is desirable to satisfy the following conditions:

$$1.0 < -q_{21} < 8.0 \quad (11)$$

$$0.3 < -q_{22} < 1.5 \quad (12)$$

Such construction of the second lens group is also effective for the correction of chromatic difference of magnification.

The second lens group $G_2$, depending on the combination thereof with the first lens group $G_1$, may be of a cemented construction having the shape of a positive meniscus lens convex toward the image side and yet comprising a negative and a positive lens or a positive and a negative lens. Where the second lens group comprises a single or cemented positive meniscus lens, when the shape factor representing the shape as the whole is $q_2$, it is desirable to satisfy the following condition:

$$1.0 < -q_2 < 5.5 \quad (13)$$

By this condition, the oblique light beam can reasonably be converted into a telecentric light beam and further, such a shape is suitable to secure a back focal length sufficiently and to enable the same kind of converters to be series-connected. If the lower limit of this condition is exceeded, astigmatism, coma and distortion will occur. However, this shape may cause spherical aberration to occur and therefore cannot be too extreme, but the range up to the upper limit of condition (13) is suitable.

Figure 3:
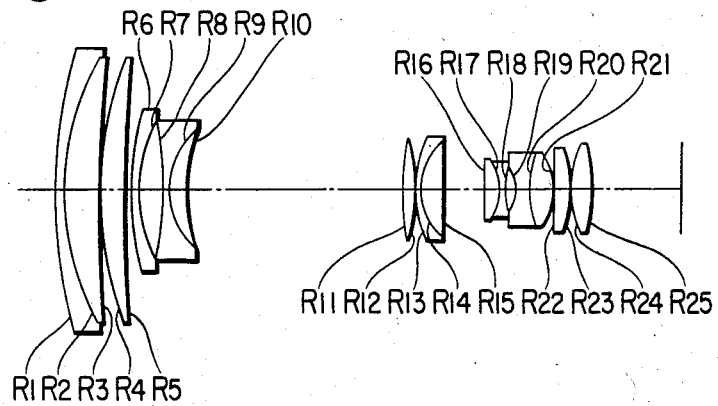
FIG. 3 shows the construction of a standard objective lens in the shortest focal length condition.

Description will hereinafter be made of some embodiments of the telecentric rear converter according to the present invention. Each embodiment is designed as a high magnification zoom lens of 8×–10× for video and an objective lens with F-number 1.6 and image height y=5.5 as the standard, whereas the present invention is not restricted thereto but is applicable to any lens when it is desired to enlarge the focus range of the objective lens of a telecentric optical system β times while maintaining its telecentricity. The construction of this standard objective lens in the shortest focal length condition is shown in FIG. 3 and the numerical data thereof will be shown below. This telecentric zoom lens is known from Japanese Laid-open Patent Application No. 1010/1981. The subscript numbers of the symbols in the table below represent the order from the object side.

Standard Objective Lens
Focal length f=18.3 F-number 1.6
Back focal length Bf=24.27047
(Stop is disposed at 6.599 behind the fifteenth surface)

| Radius of curvature | | Center thickness and air space | | Refractive index | | Abbe number |
|---|---|---|---|---|---|---|
| $R_1$ | 112.519 | $d_1$ | 2.5 | $n_1$ | 1.805 $\nu_1$ | 25.36 |
| $R_2$ | 63.5 | $d_2$ | 8.9 | $n_2$ | 1.622 $\nu_2$ | 58.22 |
| $R_3$ | 354.673 | $d_3$ | 0.1 | | | |
| $R_4$ | 78.011 | $d_4$ | 6.83 | $n_3$ | 1.622 $\nu_3$ | 58.22 |
| $R_5$ | 413.791 | $d_5$ | 2.051 | | | |
| $R_6$ | 74.511 | $d_6$ | 1.5 | $n_4$ | 1.696 $\nu_4$ | 55.61 |
| $R_7$ | 36.371 | $d_7$ | 6.89 | | | |
| $R_8$ | −78.902 | $d_8$ | 1.5 | $n_5$ | 1.696 $\nu_5$ | 55.61 |

-continued

| | Radius of curvature | Center thickness and air space | | Refractive index | | Abbe number |
|---|---|---|---|---|---|---|
| $R_9$ | 20.974 | $d_9$ | 4.24 | $n_6$ | 1.805 $\nu_6$ | 25.36 |
| $R_{10}$ | 39.997 | $d_{10}$ | 58.265 | | | |
| $R_{11}$ | 55.725 | $d_{11}$ | 3.6 | $n_7$ | 1.622 $\nu_7$ | 58.22 |
| $R_{12}$ | −114.147 | $d_{12}$ | 0.1 | | | |
| $R_{13}$ | 28.944 | $d_{13}$ | 1.34 | $n_8$ | 1.805 $\nu_8$ | 25.36 |
| $R_{14}$ | 17.26 | $d_{14}$ | 6.0 | $n_9$ | 1.622 $\nu_9$ | 58.22 |
| $R_{15}$ | 1983.433 (Stop) | $d_{15}$ | 11.114 | | | |
| $R_{16}$ | −98.122 | $d_{16}$ | 4.3 | $n_{10}$ | 1.805 $\nu_{10}$ | 25.36 |
| $R_{17}$ | −11.858 | $d_{17}$ | 1.5 | $n_{11}$ | 1.696 $\nu_{11}$ | 55.61 |
| $R_{18}$ | 33.541 | $d_{18}$ | 2.57 | | | |
| $R_{19}$ | −10.993 | $d_{19}$ | 4.43 | $n_{12}$ | 1.805 $\nu_{12}$ | 25.36 |
| $R_{20}$ | 25.845 | $d_{20}$ | 6.14 | $n_{13}$ | 1.658 $\nu_{13}$ | 50.84 |
| $R_{21}$ | −16.308 | $d_{21}$ | 0.18 | | | |
| $R_{22}$ | −184.976 | $d_{22}$ | 5.1 | $n_{14}$ | 1.568 $\nu_{14}$ | 56.04 |
| $R_{23}$ | −28.828 | $d_{23}$ | 0.13 | | | |
| $R_{24}$ | 32.121 | $d_{24}$ | 4.5 | $n_{15}$ | 1.568 $\nu_{15}$ | 56.04 |
| $R_{25}$ | −127.822 | | | | | |

Figure 4:
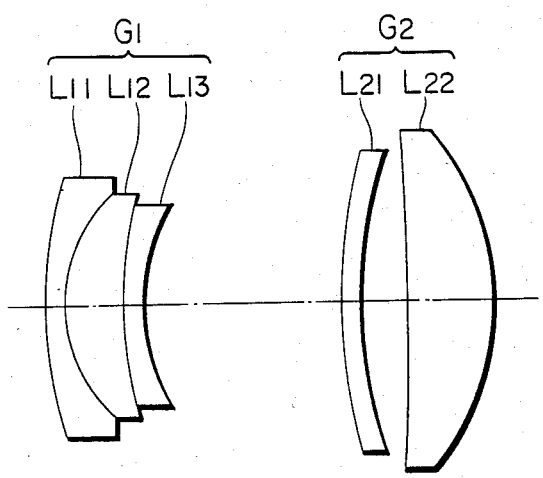
FIG. 4 shows the lens construction of a first embodiment of the present invention.

In a first embodiment of the present invention, as shown in FIG. 4, the first lens group $G_1$ comprises a cemented lens consisting of a negative meniscus lens $L_{11}$ convex toward the object side, a positive meniscus lens $L_{12}$ convex toward the object side and a negative meniscus lens $L_{13}$ convex toward the object side, and the second lens group $G_2$ comprises a negative meniscus lens $L_{21}$ convex toward the object side and a positive meniscus lens $L_{21}$ convex toward the image side. The magnification $\beta = 2.0$.

Figure 5:
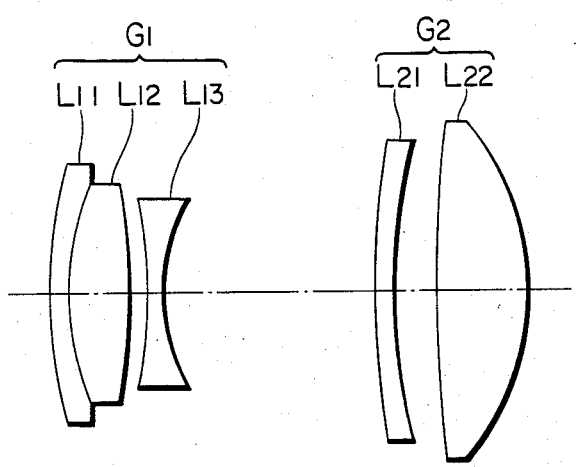
FIG. 5 shows the lens construction of a second embodiment of the present invention.
Figure 6:
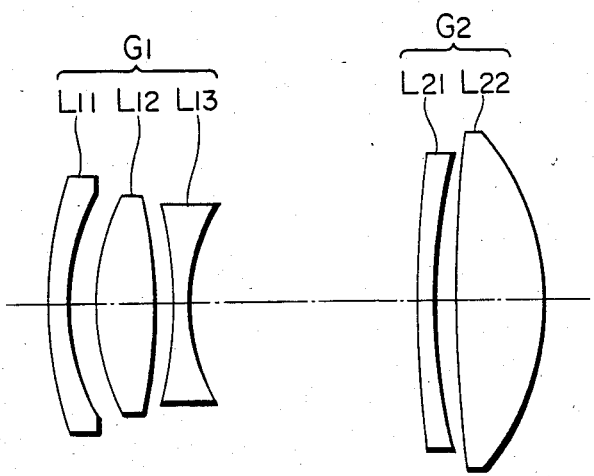
FIG. 6 shows the lens construction of a third embodiment of the present invention.

In a second embodiment, as shown in FIG. 5, the cemented surfaces of the first lens group $G_1$ which are adjacent to the image side are separated from each other to achieve improvement of spherical aberration and coma. In a third embodiment, as shown in FIG. 6, the three lenses of the first lens group $G_1$ are all separated from one another. In these cases, the negative lens in the first lens group $G_1$ which is most adjacent to the object side is of a meniscus shape convex toward the object side, while the positive lens is biconvex positive lens having its surface of sharper curvature facing the object side, and the negative lens in the first lens group which is most adjacent to the image side is a biconcave lens having its surface of sharper curvature facing the image side. Again in the second and third embodiments, the magnification $\beta = 2.0$.

Figure 7:
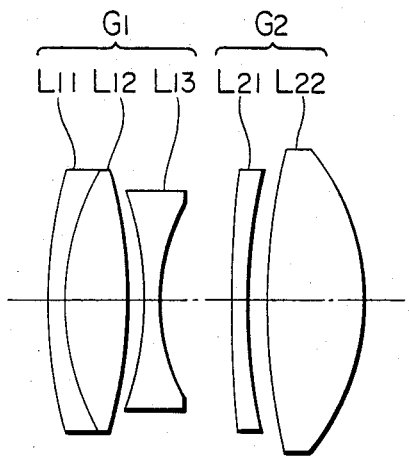
FIG. 7 shows the lens construction of a fourth embodiment of the present invention.
Figure 8:
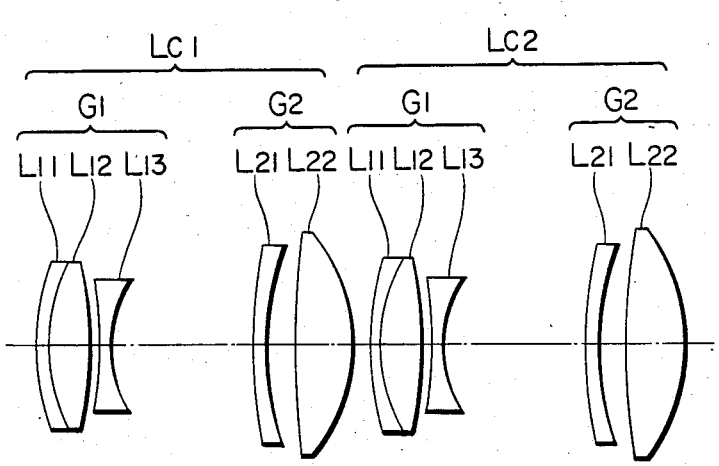
FIG. 8 shows the lens construction of a fifth embodiment of the present invention.
Figure 9:
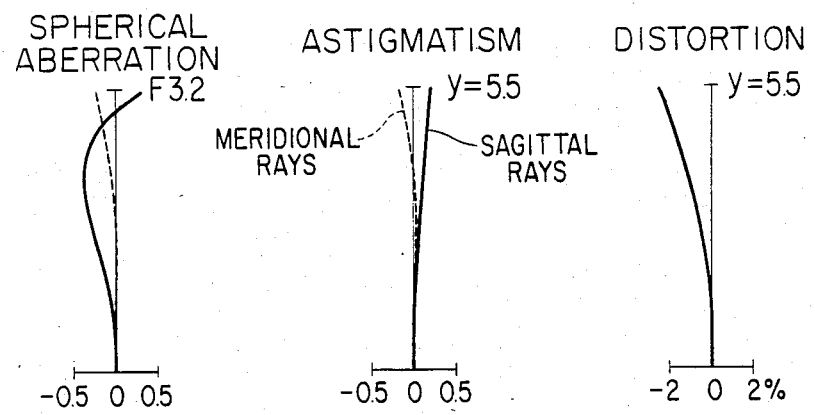
FIGS. 9 to 13 show the various aberrations when the rear converters according to the first to fifth embodiments have been mounted on the standard objective lens.
Figure 10:
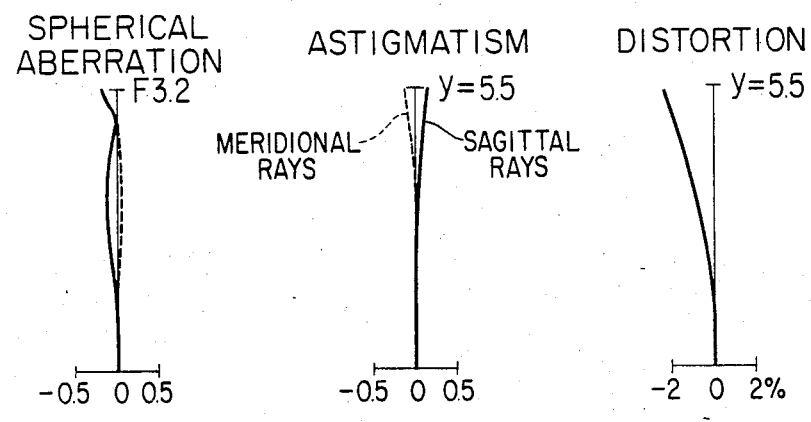
Figure 11:
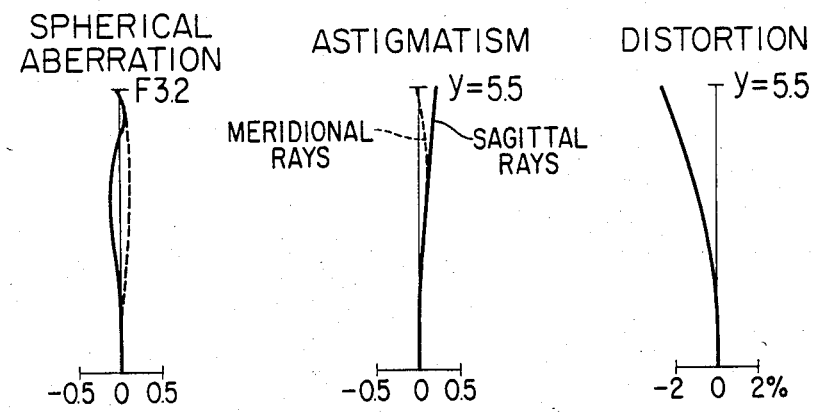
Figure 12:
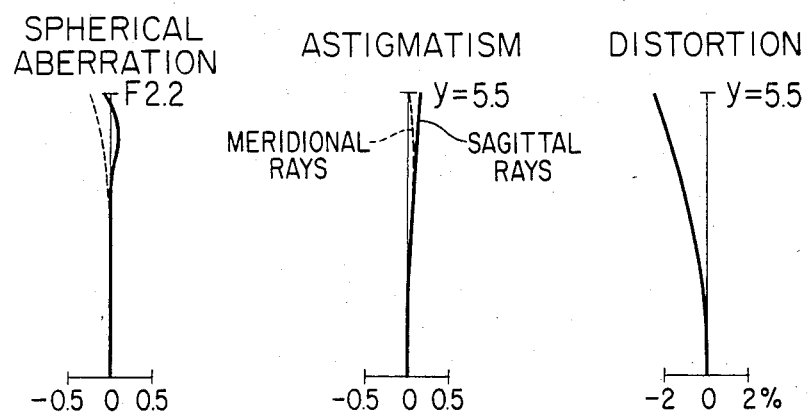
Figure 13:
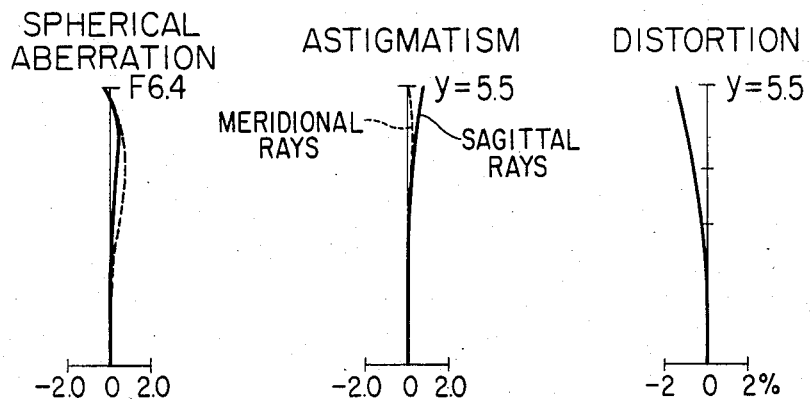

A fourth embodiment, as shown in FIG. 7, has a lens construction substantially similar to that of the second embodiment (FIG. 5), but the magnification $\beta = 1.4$ and therefore, the spacing between the first lens group $G_1$ and the second lens group $G_2$ is relatively small and various aberrations are corrected so that this embodiment is usable as a bright system. A fifth embodiment shown in FIG. 8 has two telecentric rear converters of the second embodiment (FIG. 5) series-connected and obtains a composite magnification $\beta = 4.0$.

The numerical data of the first to fifth embodiments will be shown below. In each table below, the subscript numbers of the symbols represent the order from the object side, $d_0$ represents the distance between the image point by the standard objective lens, namely, the object point as viewed from the rear converter, and the foremost lens surface of the rear converter, and Bf represents the back focal length when the rear converter has been mounted on the standard objective lens.

| | Radius of curvature | Center thickness and air space | | Refractive index | | Abbe number | | |
|---|---|---|---|---|---|---|---|---|
| First Embodiment | | | | | | | | |
| $\beta = 2.0$ | | $d_0 = -17.49837$ | | | | | | |
| | | $Bf = 20.68658$ | | | | | | |
| $r_1$ | 20.0 | $d_1$ | 1.0 | $n_1$ | 1.713 $\nu_1$ | 53.97 | $L_{11}$ | ⎫ |
| $r_2$ | 6.729 | $d_2$ | 3.5 | $n_2$ | 1.595 $\nu_2$ | 35.51 | $L_{12}$ | ⎬ $G_1$ |
| $r_3$ | 19.151 | $d_3$ | 1.0 | $n_3$ | 1.796 $\nu_3$ | 45.52 | $L_{13}$ | ⎭ |
| $r_4$ | 7.735 | $d_4$ | 11.76 | | | | | |
| $r_5$ | 30.044 | $d_5$ | 1.0 | $n_4$ | 1.805 $\nu_4$ | 25.36 | $L_{21}$ | ⎫ |
| $r_6$ | 22.674 | $d_6$ | 2.5 | | | | | ⎬ $G_2$ |
| $r_7$ | −169.544 | $d_7$ | 5.0 | $n_5$ | 1.516 $\nu_5$ | 64.12 | $L_{22}$ | ⎭ |
| $r_8$ | −11.629 | | | | | | | |
| Second Embodiment | | | | | | | | |
| $\beta = 2.0$ | | $d_0 = -19.82967$ | | | | | | |
| | | $Bf = 21.1534$ | | | | | | |
| $r_1$ | 20.0 | $d_1$ | 1.0 | $n_1$ | 1.713 $\nu_1$ | 53.97 | $L_{11}$ | ⎫ |
| $r_2$ | 11.740 | $d_2$ | 3.5 | $n_2$ | 1.595 $\nu_2$ | 35.51 | $L_{12}$ | ⎬ $G_1$ |
| $r_3$ | −28.926 | $d_3$ | 1.0 | | | | | |
| $r_4$ | −21.533 | $d_4$ | 1.0 | $n_3$ | 1.796 $\nu_3$ | 45.52 | $L_{13}$ | ⎭ |
| $r_5$ | 8.784 | $d_5$ | 12.312 | | | | | |
| $r_6$ | 43.024 | $d_6$ | 1.0 | $n_4$ | 1.805 $\nu_4$ | 25.36 | $L_{21}$ | ⎫ |
| $r_7$ | 22.856 | $d_7$ | 2.5 | | | | | ⎬ $G_2$ |
| $r_8$ | 72.604 | $d_8$ | 5.0 | $n_5$ | 1.516 $\nu_5$ | 64.12 | $L_{22}$ | ⎭ |
| $r_9$ | −12.466 | | | | | | | |
| Third Embodiment | | | | | | | | |
| $\beta = 2.0$ | | $d_0 = -19.94969$ | | | | | | |
| | | $Bf = 20.72529$ | | | | | | |
| $r_1$ | 20.0 | $d_1$ | 1.0 | $n_1$ | 1.713 $\nu_1$ | 53.97 | $L_{11}$ | ⎫ |
| $r_2$ | 10.351 | $d_2$ | 1.5 | | | | | |
| $r_3$ | 10.799 | $d_3$ | 3.5 | $n_2$ | 1.575 $\nu_2$ | 41.55 | $L_{12}$ | ⎬ $G_1$ |
| $r_4$ | −23.172 | $d_4$ | 1.0 | | | | | |
| $r_5$ | −17.582 | $d_5$ | 1.0 | $n_3$ | 1.713 $\nu_3$ | 53.97 | $L_{13}$ | ⎭ |
| $r_6$ | 8.652 | $d_6$ | 13.276 | | | | | |
| $r_7$ | 84.730 | $d_7$ | 1.0 | $n_4$ | 1.805 $\nu_4$ | 25.36 | $L_{21}$ | ⎫ |
| $r_8$ | 29.710 | $d_8$ | 1.0 | | | | | ⎬ $G_2$ |
| $r_9$ | 67.132 | $d_9$ | 5.0 | $n_5$ | 1.516 $\nu_5$ | 64.12 | $L_{22}$ | ⎭ |
| $r_{10}$ | −12.057 | | | | | | | |
| Fourth Embodiment | | | | | | | | |
| $\beta = 1.4$ | | $d_0 = -19.84093$ | | | | | | |
| | | $Bf = 16.86856$ | | | | | | |
| $r_1$ | 20.0 | $d_1$ | 1.0 | $n_1$ | 1.713 $\nu_1$ | 53.97 | $L_{11}$ | ⎫ |
| $r_2$ | 11.740 | $d_2$ | 3.5 | $n_2$ | 1.595 $\nu_2$ | 35.51 | $L_{12}$ | ⎬ $G_1$ |
| $r_3$ | −23.079 | $d_3$ | 1.0 | | | | | |
| $r_4$ | −15.158 | $d_4$ | 1.0 | $n_3$ | 1.796 $\nu_3$ | 45.52 | $L_{13}$ | ⎭ |
| $r_5$ | 9.857 | $d_5$ | 4.314 | | | | | |
| $r_6$ | 87.961 | $d_6$ | 1.0 | $n_4$ | 1.805 $\nu_4$ | 25.36 | $L_{21}$ | ⎫ |
| $r_7$ | 25.111 | $d_7$ | 1.0 | | | | | ⎬ $G_2$ |
| $r_8$ | 27.343 | $d_8$ | 5.5 | $n_5$ | 1.516 $\nu_5$ | 64.12 | $L_{22}$ | ⎭ |
| $r_9$ | −10.414 | | | | | | | |
| Fifth Embodiment | | | | | | | | |
| $\beta = 4.0$ | | $d_0 = -19.82967$ | | | | | | |
| | | $Bf = 21.153$ | | | | | | |
| $r_1$ | 20.0 | $d_1$ | 1.0 | $n_1$ | 1.713 $\nu_1$ | 53.97 | $L_{11}$ | ⎫ |
| $r_2$ | 11.740 | $d_2$ | 3.5 | $n_2$ | 1.595 $\nu_2$ | 35.51 | $L_{12}$ | ⎬ $G_1$ |
| $r_3$ | −28.926 | $d_3$ | 1.0 | | | | | |
| $r_4$ | −21.533 | $d_4$ | 1.0 | $n_3$ | 1.796 $\nu_3$ | 45.52 | $L_{13}$ | ⎭ |
| $r_5$ | 8.784 | $d_5$ | 12.312 | | | | | |
| $r_6$ | 43.024 | $d_6$ | 1.0 | $n_4$ | 1.805 $\nu_4$ | 25.36 | $L_{21}$ | ⎫ |
| $r_7$ | 22.856 | $d_7$ | 2.5 | | | | | ⎬ $G_2$ |
| $r_8$ | 72.604 | $d_8$ | 5.0 | $n_5$ | 1.516 $\nu_5$ | 64.12 | $L_{22}$ | ⎭ |
| $r_9$ | −12.466 | $d_9$ | 1.323 | | | | | |
| $r_{10}$ | 20.0 | $d_{10}$ | 1.0 | $n_6$ | 1.713 $\nu_6$ | 53.97 | $L_{11}$ | ⎫ |
| $r_{11}$ | 11.740 | $d_{11}$ | 3.5 | $n_7$ | 1.595 $\nu_7$ | 35.51 | $L_{12}$ | ⎬ $G_1$ |
| $r_{12}$ | −28.926 | $d_{12}$ | 1.0 | | | | | |
| $r_{13}$ | −21.533 | $d_{13}$ | 1.0 | $n_8$ | 1.796 $\nu_8$ | 45.52 | $L_{13}$ | ⎭ |
| $r_{14}$ | 8.784 | $d_{14}$ | 12.312 | | | | | |
| $r_{15}$ | 43.024 | $d_{15}$ | 1.0 | $n_9$ | 1.805 $\nu_9$ | 25.36 | $L_{21}$ | ⎫ |
| $r_{16}$ | 22.856 | $d_{16}$ | 2.5 | | | | | ⎬ $G_2$ |
| $r_{17}$ | 72.604 | $d_{17}$ | 5.0 | $n_{10}$ | 1.516 $\nu_{10}$ | 64.12 | $L_{22}$ | ⎭ |
| $r_{18}$ | −12.466 | | | | | | | |

The various aberrations when the telecentric rear converters of the first to fifth embodiments have been mounted on the standard objective lens are shown in FIGS. 9 to 13, respectively. The sine condition is also shown by a dotted line in each graph of spherical aberration.

It is apparent from these aberration graphs that in each embodiment, the various aberrations are corrected sufficiently well and particularly in the fifth embodiment, a practically sufficiently good imaging performance is maintained in spite of two stages of rear converters being connected together.

Now, embodiments of the simplest construction among the telecentric converters according to the present invention will be shown below. In a sixth embodiment shown in FIG. 14, the magnification $\beta=2.0$, but the first lens group $G_1$ comprises only a negative meniscus lens $L_{11}$ having its convex surface facing the object side and the second lens group $G_2$ comprises only a positive meniscus lens $L_{21}$ having its convex surface facing the image side. The rear converter of such construction has any of spherical aberration, astigmatism, coma and distortion except chromatic aberration well corrected, is effective chiefly for an image pickup optical system for monochrome and can be produced at very low cost. The negative meniscus lens $L_{11}$ of the first lens group $G_1$ should desirably satisfy the aforementioned condition (8), and the positive meniscus lens $L_{21}$ of the second lens group $G_2$ should desirably satisfy the aforementioned condition (13).

Figure 14:
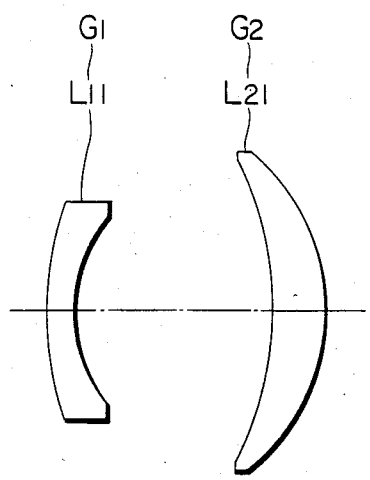
FIG. 14 shows the lens construction of a sixth embodiment of the present invention.
Figure 15:
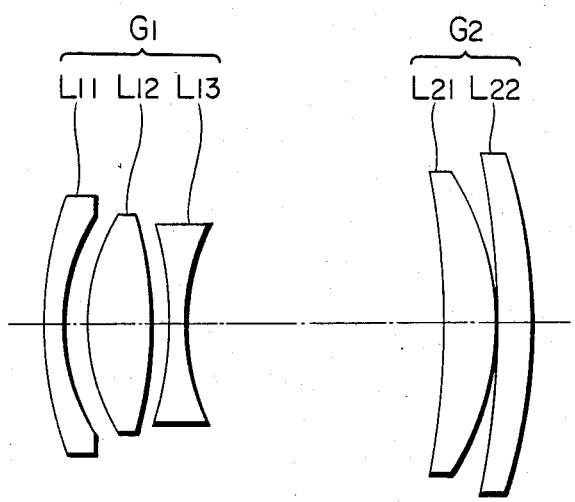
FIG. 15 shows the lens construction of a seventh embodiment of the present invention.

In a seventh embodiment, as shown in FIG. 15, the first lens group $G_1$, as in the third embodiment of FIG. 6, comprises a negative meniscus lens $L_{11}$ having its convex surface facing the object side, a biconvex lens $L_{12}$ having its surface of sharper curvature facing the object side and a biconcave lens $L_{13}$ having its surface of sharper curvature facing the image side, and the second lens group $G_2$, as in the sixth embodiment of FIG. 14, comprises two positive meniscus lenses $L_{21}$, $L_{22}$ convex toward the image side. In this construction, some chromatic difference of magnification occurs, but astigmatic difference and coma can be corrected better and the magnification $\beta=2.0$ can be obtained.

Figure 16:
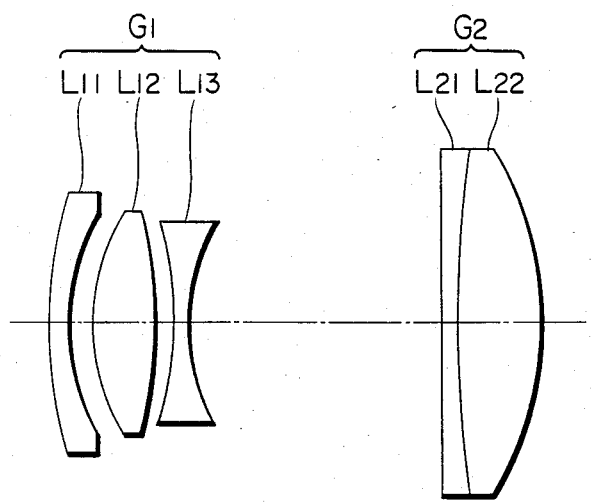
FIG. 16 shows the lens construction of an eighth embodiment of the present invention.
Figure 17:
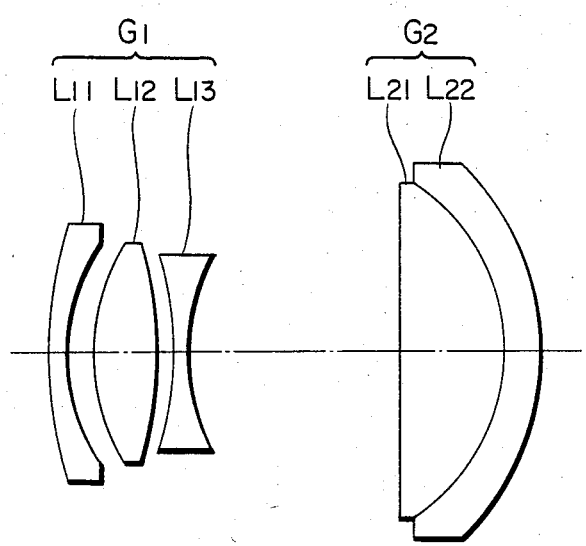
FIG. 17 shows the lens construction of a ninth embodiment of the present invention.
Figure 18:
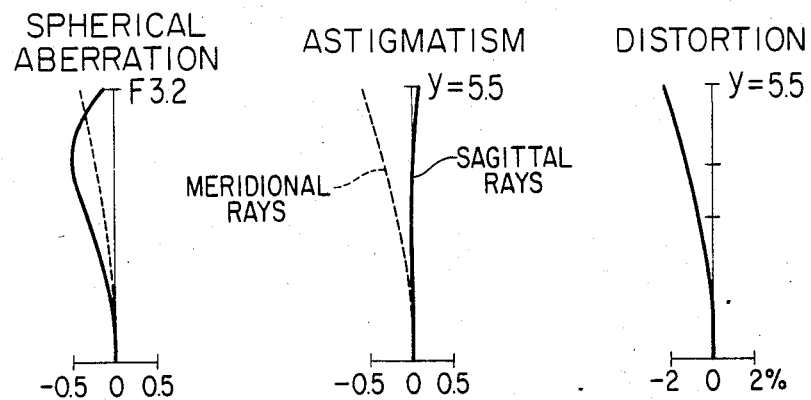
FIGS. 18 to 21 show the various aberrations when the rear converters according to the sixth to ninth embodiments have been mounted on the standard objective lens.
Figure 19:
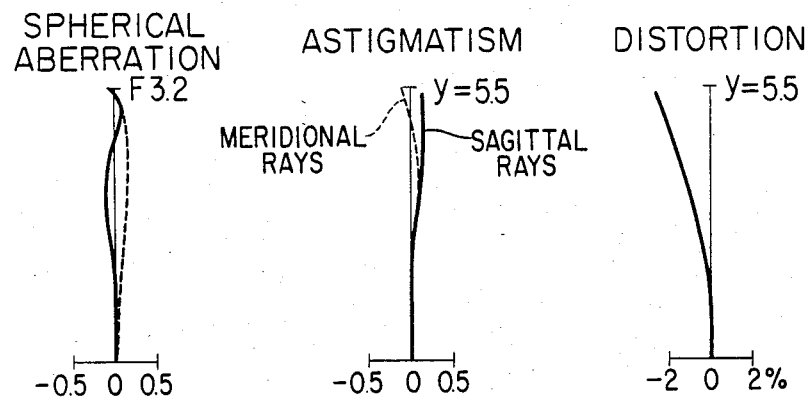
Figure 20:
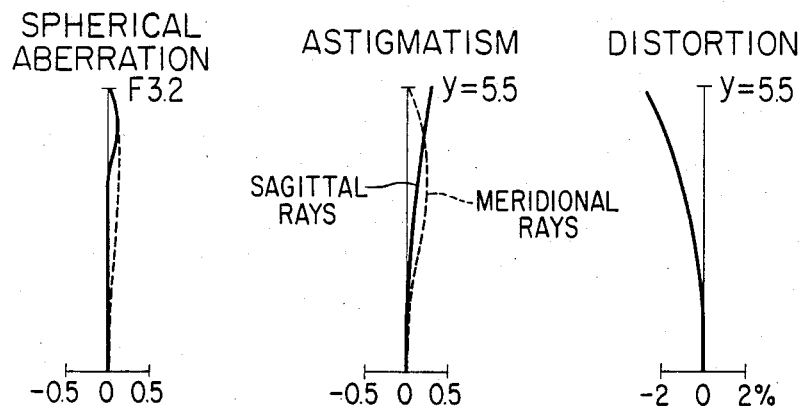
Figure 21:
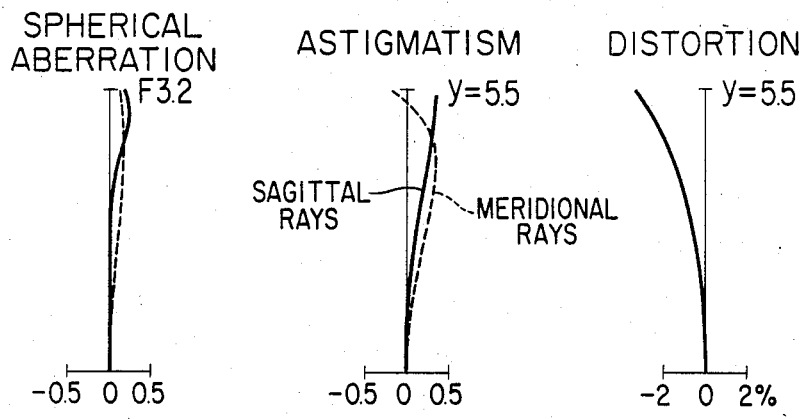

In an eighth embodiment shown in FIG. 16 and a ninth embodiment shown in FIG. 17, the first lens group $G_1$ is similar to that of the seventh embodiment (FIG. 15) and the second lens group $G_2$ comprises a cemented positive meniscus lens having its convex surface facing the image side. That is, in the eighth embodiment, a biconcave negative lens $L_{21}$ and a biconvex positive lens $L_{22}$ are cemented together to form the second lens group $G_2$, and in the ninth embodiment, a positive meniscus lens $L_{21}$ having its convex surface facing the image side and a negative meniscus lens $L_{22}$ having its convex surface facing the image side are cemented together to form the second lens group $G_2$, and in both of these embodiments, the shape of the second lens group $G_2$ as a whole satisfies the aforementioned condition (13). In these two embodiments, the magnification $\beta=2.0$.

The numerical data of the sixth to ninth embodiments will be shown below.

| Radius of curvature | Center thickness and air space | Refractive index | Abbe number | | |
|---|---|---|---|---|---|
| Sixth Embodiment | | | | | |
| $\beta = 2.0$ { $d_0 = -21.48263$ | | | | | |
| $Bf = 22.16468$ | | | | | |
| $r_1$ 14.367 | $d_1$ 1.5 | $n_1$ 1.756 | $\nu_1$ 31.70 | $L_{11}$ | $G_1$ |
| $r_2$ 6.056 | $d_2$ 11.659 | | | | |
| $r_3$ −14.491 | $d_3$ 3.0 | $n_2$ 1.744 | $\nu_2$ 49.46 | $L_{21}$ | $G_2$ |
| $r_4$ −9.565 | | | | | |
| Seventh Embodiment | | | | | |
| $\beta = 2.0$ { $d_0 = -19.1769$ | | | | | |
| $Bf = 20.9767$ | | | | | |
| $r_1$ 20.0 | $d_1$ 1.0 | $n_1$ 1.796 | $\nu_1$ 45.52 | $L_{11}$ | |
| $r_2$ 9.212 | $d_2$ 1.5 | | | | |
| $r_3$ 10.197 | $d_3$ 3.5 | $n_2$ 1.575 | $\nu_2$ 41.55 | $L_{12}$ | $G_1$ |
| $r_4$ −19.107 | $d_4$ 1.0 | 1.0 | | | |
| $r_5$ −15.388 | $d_5$ 1.0 | $n_3$ 1.713 | $\nu_3$ 53.97 | $L_{13}$ | |
| $r_6$ 10.392 | $d_6$ 14.866 | 1.0 | | | |
| $r_7$ −34.376 | $d_7$ 3.0 | $n_4$ 1.516 | $\nu_4$ 64.12 | $L_{21}$ | |
| $r_8$ −12.656 | $d_8$ 0.1 | 1.0 | | | $G_2$ |
| $r_9$ −35.316 | $d_9$ 2.0 | $n_5$ 1.516 | $\nu_5$ 64.12 | $L_{22}$ | |
| $r_{10}$ −22.620 | | | | | |
| Eighth Embodiment | | | | | |
| $\beta = 2.0$ { $d_0 = -19.28504$ | | | | | |
| $Bf = 19.7474$ | | | | | |
| $r_1$ 20.0 | $d_1$ 1.0 | $n_1$ 1.796 | $\nu_1$ 45.52 | $L_{11}$ | |
| $r_2$ 9.566 | $d_2$ 1.5 | | | | |
| $r_3$ 9.923 | $d_3$ 3.5 | $n_2$ 1.575 | $\nu_2$ 41.55 | $L_{12}$ | $G_1$ |
| $r_4$ −21.215 | $d_4$ 1.0 | | | | |
| $r_5$ −16.701 | $d_5$ 1.0 | $n_3$ 1.713 | $\nu_3$ 53.97 | $L_{13}$ | |
| $r_6$ 9.443 | $d_6$ 14.651 | | | | |
| $r_7$ 344.517 | $d_7$ 1.0 | $n_4$ 1.805 | $\nu_4$ 25.36 | $L_{21}$ | $G_2$ |
| $r_8$ 50.681 | $d_8$ 5.0 | $n_5$ 1.516 | $\nu_5$ 64.12 | $L_{22}$ | |
| $r_9$ −13.577 | | | | | |
| Ninth Embodiment | | | | | |
| $\beta = 2.0$ { $d_0 = -18.87687$ | | | | | |
| $Bf = 20.78815$ | | | | | |
| $r_1$ 20.0 | $d_1$ 1.0 | $n_1$ 1.796 | $\nu_1$ 45.52 | $L_{11}$ | |
| $r_2$ 9.212 | $d_2$ 1.5 | | | | |
| $r_3$ 10.197 | $d_3$ 3.5 | $n_2$ 1.575 | $\nu_2$ 41.55 | $L_{12}$ | $G_1$ |
| $r_4$ −19.107 | $d_4$ 1.0 | | | | |
| $r_5$ −15.388 | $d_5$ 1.0 | $n_3$ 1.713 | $\nu_3$ 53.97 | $L_{13}$ | |
| $r_6$ 10.392 | $d_6$ 12.240 | | | | |
| $r_7$ −213.644 | $d_7$ 6.0 | $n_4$ 1.516 | $\nu_4$ 64.12 | $L_1$ | $G_2$ |
| $r_8$ −9.485 | $d_8$ 2.0 | $n_5$ 1.805 | $\nu_5$ 25.36 | $L_2$ | |
| $r_9$ −12.352 | | | | | |

The various aberrations when the telecentric rear converters of the sixth to ninth embodiments have been mounted on the standard objective lens are shown in FIGS. 18 to 21, respectively. It is apparent from these aberration graphs that even if the construction of each lens group is made simpler, the rear converters have a practically sufficient imaging performance while maintaining telecentricity.

With regard to the first to ninth embodiments, the values of the previously described basic constructions of the present invention will be shown in Table 1 below and the values of the shape factors prescribing the shapes of the lenses forming each lens group will be shown in Table 2 below.

TABLE 1

| Embodiment No. | $f_1$ | $f_2$ | a | m | $\frac{a}{|f_1|}$ | $\frac{f_2}{m+|f_1|}$ | $\frac{f_2}{|f_1|}$ | $\beta$ |
|---|---|---|---|---|---|---|---|---|
| 1 | −15.0 | 28.5 | 12.62 | 18.0 | 0.84 | 0.86 | 1.9 | 2.0 |
| 2 | −15.0 | 28.5 | 12.62 | 18.0 | 0.84 | 0.86 | 1.9 | 2.0 |
| 3 | −15.0 | 28.5 | 12.62 | 18.0 | 0.84 | 0.86 | 1.9 | 2.0 |
| 4 | −15.0 | 21.0 | 12.62 | 8.0 | 0.84 | 0.91 | 1.4 | 1.4 |
| 5 (Two connected) | −15.0 | 28.5 | 12.62 | 18.0 | 0.84 | 0.86 | 1.9 | 4.0 |
| 6 | −15.0 | 30.0 | 12.67 | 15.0 | 0.84 | 1.0 | 2.0 | 2.0 |
| 7 | −15.0 | 28.5 | 12.92 | 18.0 | 0.86 | 0.86 | 1.9 | 2.0 |
| 8 | −15.0 | 28.5 | 12.62 | 18.0 | 0.84 | 0.86 | 1.9 | 2.0 |
| 9 | −15.0 | 28.5 | 12.62 | 18.0 | 0.84 | 0.86 | 1.9 | 2.0 |

TABLE 2

| Embodiment No. | First lens group G$_1$ | | | Second lens group G$_2$ | |
|---|---|---|---|---|---|
| | q$_{11}$ | q$_{12}$ | q$_{13}$ | q$_{21}$ | q$_{22}$ |
| 1 | −2.01 | 2.08 | −2.36 | −7.15 | −1.15 |
| 2 | −3.84 | 0.42 | −0.42 | −3.27 | −0.71 |
| 3 | −3.15 | 0.36 | −0.34 | −2.08 | −0.70 |
| 4 | −3.84 | 0.33 | −0.21 | −1.80 | −0.45 |
| 5 (Two connected) | −3.84 | 0.42 | −0.42 | −3.27 | −0.71 |
| 6 | −2.46 | | | −4.88 | |
| 7 | −2.71 | 0.30 | −0.19 | −2.17 | −4.56 |
| 8 | −2.83 | 0.36 | −0.28 | −1.08 | |
| 9 | −2.71 | 0.30 | −0.19 | −1.12 | |

It is to be understood that when the radii of curvature of the object side and image side surfaces of the lens are $r_a$ and $r_b$, respectively, the shape factor q is defined as $$q = \frac{r_b + r_a}{r_b - r_a}.$$

As described above, according to the present invention, there can be achieved a telecentric rear converter which enlarges the focal length of an objective lens by a predetermined magnification without destroying the telecentricity of the objective lens and which maintains an excellent imaging performance even if mounted on a bright objective lens of F1.6. The present invention can very simply enlarge the photographic area of an objective lens for recording images in the use of an image pickup tube or element for a video camera, and can prevent occurrence of color misregistration.

Figure 1:
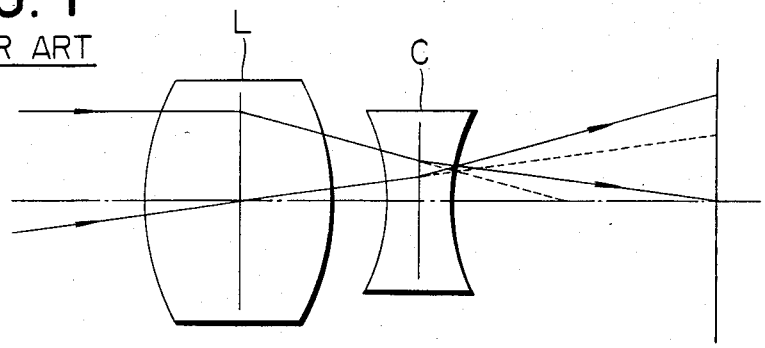
FIG. 1 illustrates the principle of a popular rear converter.

The telecentric rear converter according to the present invention is not only mountable on a telecentric objective lens but also mountable on an objective lens for an ordinary single lens reflex camera. The rear converter of the present invention is of a relatively large shape because the spacing between the first lens group and the second lens group is great, but it has the feature that the position of the exit pupil does not change even if it is mounted on an objective lens. In the conventional rear converter, the position of the exit pupil comes close to the image side as shown in FIG. 1 and therefore, eclipse may occur in the field of view of the finder or the quantity of light in the marginal portion may become deficient, but if the telecentric rear converter of the present invention is used, such problems will not arise because the position of the exit pupil does not change.

I claim:

1. In combination with a substantially telecentric objective lens, a telecentric rear converter mounted on the image side of the objective lens to make the composite focal length of said rear converter and said objective lens greater than the focal length of said objective lens while maintaining the telecentricity, said telecentric rear converter including:
    a first lens unit of a negative refractive power; and
    a second lens unit of a positive refractive power disposed on the image side of said first lens unit;
    said two lens units being disposed so that the spacing between the principal points thereof is substantially equal to the difference between the respective absolute values of the focal lengths of said two lens units, said first lens unit having a rearward focus substantially coincident with the image point of said telecentric objective lens and converting a convergent light beam from said telecentric objective lens into a substantially parallel light beam, and said second lens unit converging the substantially parallel light beam while maintaining the telecentricity and forming an image at a predetermined back focal length position that is of a size different from the size of an image from said objective lens.

2. A telecentric rear converter mountable on the image side of a substantially telecentric objective lens to make the composite focal length of said rear converter and said objective lens greater than the focal length of said objective lens while maintaining the telecentricity, said telecentric rear converter including:
    a first lens unit of a negative refractive power; and
    a second lens unit of a positive refractive power disposed on the image side of said first lens unit;
    wherein said two lens units are disposed so that the spacing between the principal points thereof is substantially equal to the difference between the respective absolute values of the focal lengths of said two lens units, and when said telecentric rear converter is mounted on the image side of said objective lens, the rearward focus of said first lens unit is substantially coincident with the image point of said telecentric objective lens and converts the convergent light beam from said telecentric objective lens into a substantially parallel light beam, and said second lens unit converges the substantially parallel light beam while maintaining the telecentricity and providing a predetermined back focal length, said telecentric rear converter changing the size of an image from said substantially telecentric objective lens, and wherein said telecentric rear converter satisfies the following conditions:

$$0.7 < \frac{a}{|f_1|} < 1.2$$

$$0.7 < \frac{f_2}{m + |f_1|} < 1.5$$

$$0.8\beta < \frac{f_2}{|f_1|} < 1.4\beta$$

wherein $f_1$ and $f_2$ are the focal lengths of said first lens unit and said second lens unit, respectively, $\beta$ is the magnification of said telecentric rear converter, m is the spacing between the principal points of said first and second lens units, and a is the distance between the image point by said objective lens and the principal point of said first lens unit when said rear converter has been mounted on said objective lens.

3. A telecentric rear converter according to claim 2, wherein said first lens unit includes, in succession from the object side, a negative meniscus lens convex toward the object side, a positive lens having its surface of sharper curvature facing the object side, and a negative lens having its surface of sharper curvature facing the image side.

4. A telecentric rear converter according to claim 3, wherein said second lens unit includes, in succession from the object side, a negative meniscus lens convex toward the object side, and a positive lens having its surface of sharper curvature facing the image side.

5. A telecentric rear converter according to claim 4, wherein when the shape factors of the negative meniscus lens, the positive lens and the negative lens in said first lens unit are $q_{11}$, $q_{12}$ and $q_{13}$, respectively, the following conditions are satisfied:

$$1.5 < -q_{11} < 4.5$$

$$0.2 < q_{12} < 3.0$$

$$0 < -q_{13} < 3.5$$

and the shape factor q of each lens is defined as $$q = \frac{r_b + r_a}{r_b - r_a}$$

where $r_a$ is the radius of curvature of the object side lens surface and $r_b$ is the radius of curvature of the image side lens surface.

6. A telecentric rear converter according to claim 5, wherein when the shape factors of the negative meniscus lens and the positive lens in said second lens unit are $q_{21}$ and $q_{22}$, respectively, the following conditions are satisfied:

$$1.0 < -q_{21} < 8.0$$

$$0.3 < -q_{22} < 1.5.$$

7. A telecentric rear converter according to claim 6, wherein numerical data are as follows:

$\beta = 2.0$ { $d_0 = -17.49837$ ; $Bf = 20.68658$ }

| Radius of curvature | | Center thickness and air space | | Refractive index | | Abbe number | | |
|---|---|---|---|---|---|---|---|---|
| $r_1$ | 20.0 | $d_1$ | 1.0 | $n_1$ | 1.713 | $v_1$ | 53.97 | $L_{11}$ ⎫ |
| $r_2$ | 6.729 | $d_2$ | 3.5 | $n_2$ | 1.595 | $v_2$ | 35.51 | $L_{12}$ ⎬ $G_1$ |
| $r_3$ | 19.151 | $d_3$ | 1.0 | $n_3$ | 1.796 | $v_3$ | 45.52 | $L_{13}$ ⎭ |
| $r_4$ | 7.735 | $d_4$ | 11.76 | | | | | |
| $r_5$ | 30.044 | $d_5$ | 1.0 | $n_4$ | 1.805 | $v_4$ | 25.36 | $L_{21}$ ⎫ |
| $r_6$ | 22.674 | $d_6$ | 2.5 | | | | | ⎬ $G_2$ |
| $r_7$ | −169.544 | $d_7$ | 5.0 | $n_5$ | 1.516 | $v_5$ | 64.12 | $L_{22}$ ⎭ |
| $r_8$ | −11.629 | | | | | | | |

8. A telecentric rear converter according to claim 6, wherein the positive lens and the negative lens in said first lens unit further satisfy the following conditions with respect to their shape factors $q_{12}$ and $q_{13}$:

$$0.2 < q_{12} < 0.6$$

$$0 < -q_{13} < 0.6.$$

9. A telecentric rear converter according to claim 8, wherein numerical data are as follows:

$\beta = 2.0$ { $d_0 = -19.82967$ ; $Bf = 21.1534$ }

| Radius of curvature | | Center thickness and air space | | Refractive index | | Abbe number | | |
|---|---|---|---|---|---|---|---|---|
| $r_1$ | 20.0 | $d_1$ | 1.0 | $n_1$ | 1.713 | $v_1$ | 53.97 | $L_{11}$ ⎫ |
| $r_2$ | 11.740 | $d_2$ | 3.5 | $n_2$ | 1.595 | $v_2$ | 35.51 | $L_{12}$ ⎬ $G_1$ |
| $r_3$ | −28.926 | $d_3$ | 1.0 | | | | | |
| $r_4$ | −21.533 | $d_4$ | 1.0 | $n_3$ | 1.796 | $v_3$ | 45.52 | $L_{13}$ ⎭ |
| $r_5$ | 8.784 | $d_5$ | 12.312 | | | | | |
| $r_6$ | 43.024 | $d_6$ | 1.0 | $n_4$ | 1.805 | $v_4$ | 25.36 | $L_{21}$ ⎫ |
| $r_7$ | 22.856 | $d_7$ | 2.5 | | | | | ⎬ $G_2$ |
| $r_8$ | 72.604 | $d_8$ | 5.0 | $n_5$ | 1.516 | $v_5$ | 64.12 | $L_{22}$ ⎭ |
| $r_9$ | −12.466 | | | | | | | |

10. A telecentric rear converter according to claim 8, wherein numerical data are as follows:

$\beta = 2.0$ { $d_0 = -19.94969$ ; $Bf = 20.72529$ }

| Radius of curvature | | Center thickness and air space | | Refractive index | | Abbe number | | |
|---|---|---|---|---|---|---|---|---|
| $r_1$ | 20.0 | $d_1$ | 1.0 | $n_1$ | 1.713 | $v_1$ | 53.97 | $L_{11}$ ⎫ |
| $r_2$ | 10.351 | $d_2$ | 1.5 | | | | | |
| $r_3$ | 10.799 | $d_3$ | 3.5 | $n_2$ | 1.575 | $v_2$ | 41.55 | $L_{12}$ ⎬ $G_1$ |
| $r_4$ | −23.172 | $d_4$ | 1.0 | | | | | |
| $r_5$ | −17.582 | $d_5$ | 1.0 | $n_3$ | 1.713 | $v_3$ | 53.97 | $L_{13}$ ⎭ |
| $r_6$ | 8.652 | $d_6$ | 13.276 | | | | | |
| $r_7$ | 84.730 | $d_7$ | 1.0 | $n_4$ | 1.805 | $v_4$ | 25.36 | $L_{21}$ ⎫ |
| $r_8$ | 29.710 | $d_8$ | 1.0 | | | | | ⎬ $G_2$ |
| $r_9$ | 67.132 | $d_9$ | 5.0 | $n_5$ | 1.516 | $v_5$ | 64.12 | $L_{22}$ ⎭ |
| $r_{10}$ | −12.057 | | | | | | | |

11. A telecentric rear converter according to claim 8, wherein numerical data are as follows:

$\beta = 1.4$ { $d_0 = -19.84093$ ; $Bf = 16.86856$ }

| Radius of curvature | | Center thickness and air space | | Refractive index | | Abbe number | | |
|---|---|---|---|---|---|---|---|---|
| $r_1$ | 20.0 | $d_1$ | 1.0 | $n_1$ | 1.713 | $v_1$ | 53.97 | $L_{11}$ ⎫ |
| $r_2$ | 11.740 | $d_2$ | 3.5 | $n_2$ | 1.595 | $v_2$ | 35.51 | $L_{12}$ ⎬ $G_1$ |
| $r_3$ | −23.079 | $d_3$ | 1.0 | | | | | |
| $r_4$ | −15.158 | $d_4$ | 1.0 | $n_3$ | 1.796 | $v_3$ | 45.52 | $L_{13}$ ⎭ |
| $r_5$ | 9.857 | $d_5$ | 4.314 | | | | | |
| $r_6$ | 87.961 | $d_6$ | 1.0 | $n_4$ | 1.805 | $v_4$ | 25.36 | $L_{21}$ ⎫ |
| $r_7$ | 25.111 | $d_7$ | 1.0 | | | | | ⎬ $G_2$ |
| $r_8$ | 27.343 | $d_8$ | 5.5 | $n_5$ | 1.516 | $v_5$ | 64.12 | $L_{22}$ ⎭ |
| $r_9$ | −10.414 | | | | | | | |

12. A telecentric rear converter according to claim 2, wherein said first lens unit has a negative meniscus lens convex toward the object side, and said second lens unit has a diverging action surface on the object side and a converging action surface on the image side.

13. A telecentric rear converter according to claim 12, wherein said second lens unit has a positive meniscus lens having its convex surface facing the image side.

14. A telecentric rear converter according to claim 13, wherein numerical data are as follows:

$$\beta = 2.0 \begin{cases} d_0 = -21.48263 \\ Bf = 22.16468 \end{cases}$$

| Radius of curvature | Center thickness and air space | Refractive index | Abbe number | | |
|---|---|---|---|---|---|
| $r_1$ 14.367 | $d_1$ 1.5 | $n_1$ 1.756 | $\nu_1$ 31.70 | $L_{11}$ | $G_1$ |
| $r_2$ 6.056 | $d_2$ 11.659 | | | | |
| $r_3$ −14.491 | $d_3$ 3.0 | $n_2$ 1.744 | $\nu_2$ 49.46 | $L_{21}$ | $G_2$ |
| $r_4$ −9.565 | | | | | |

15. A telecentric rear converter according to claim 13, wherein said first lens unit further has a positive lens having its surface of sharper curvature facing the object side, and a negative lens having its surface of sharper curvature facing the image side.

16. A telecentric rear converter according to claim 15, wherein when the shape factor of the positive meniscus lens in said second lens unit is $q_2$, the following condition is satisfied:

$$1.0 < -q_2 < 5.5.$$

17. A telecentric rear converter according to claim 16, wherein numerical data are as follows:

$$\beta = 2.0 \begin{cases} d_0 = -19.1769 \\ Bf = 20.9767 \end{cases}$$

| Radius of curvature | Center thickness and air space | Refractive index | Abbe number | | |
|---|---|---|---|---|---|
| $r_1$ 20.0 | $d_1$ 1.0 | $n_1$ 1.796 | $\nu_1$ 45.52 | $L_{11}$ | |
| $r_2$ 9.212 | $d_2$ 1.5 | | | | |
| $r_3$ 10.197 | $d_3$ 3.5 | $n_2$ 1.575 | $\nu_2$ 41.55 | $L_{12}$ | $G_1$ |
| $r_4$ −19.107 | $d_4$ 1.0 | | | | |
| $r_5$ −15.388 | $d_5$ 1.0 | $n_3$ 1.713 | $\nu_3$ 53.97 | $L_{13}$ | |
| $r_6$ 10.392 | $d_6$ 14.866 | | | | |
| $r_7$ −34.376 | $d_7$ 3.0 | $n_4$ 1.516 | $\nu_4$ 64.12 | $L_{21}$ | |
| $r_8$ −12.656 | $d_8$ 0.1 | | | | $G_2$ |
| $r_9$ −35.316 | $d_9$ 2.0 | $n_5$ 1.516 | $\nu_5$ 64.12 | $L_{22}$ | |
| $r_{10}$ −22.620 | | | | | |

18. A telecentric rear converter according to claim 16, wherein numerical data are as follows:

$$\beta = 2.0 \begin{cases} d_0 = -19.28504 \\ Bf = 19.7474 \end{cases}$$

| Radius of curvature | Center thickness and air space | Refractive index | Abbe number | | |
|---|---|---|---|---|---|
| $r_1$ 20.0 | $d_1$ 1.0 | $n_1$ 1.796 | $\nu_1$ 45.52 | $L_{11}$ | |
| $r_2$ 9.566 | $d_2$ 1.5 | | | | |
| $r_3$ 9.923 | $d_3$ 3.5 | $n_2$ 1.575 | $\nu_2$ 41.55 | $L_{12}$ | $G_1$ |
| $r_4$ −21.215 | $d_4$ 1.0 | | | | |
| $r_5$ −16.701 | $d_5$ 1.0 | $n_3$ 1.713 | $\nu_3$ 53.97 | $L_{13}$ | |
| $r_6$ 9.443 | $d_6$ 14.651 | | | | |
| $r_7$ 344.517 | $d_7$ 1.0 | $n_4$ 1.805 | $\nu_4$ 25.36 | $L_{21}$ | $G_2$ |
| $r_8$ 50.681 | $d_8$ 5.0 | $n_5$ 1.516 | $\nu_5$ 64.12 | $L_{22}$ | |
| $r_9$ −13.577 | | | | | |

19. A telecentric rear converter according to claim 16, wherein numerical data are as follows:

$$\beta = 2.0 \begin{cases} d_0 = -18.87687 \\ Bf = 20.78815 \end{cases}$$

| Radius of curvature | Center thickness and air space | Refractive index | Abbe number | | |
|---|---|---|---|---|---|
| $r_1$ 20.0 | $d_1$ 1.0 | $n_1$ 1.796 | $\nu_1$ 45.52 | $L_{11}$ | |
| $r_2$ 9.212 | $d_2$ 1.5 | | | | |
| $r_3$ 10.197 | $d_3$ 3.5 | $n_2$ 1.575 | $\nu_2$ 41.55 | $L_{12}$ | $G_1$ |
| $r_4$ −19.107 | $d_4$ 1.0 | | | | |
| $r_5$ −15.388 | $d_5$ 1.0 | $n_3$ 1.713 | $\nu_3$ 53.97 | $L_{13}$ | |
| $r_6$ 10.392 | $d_6$ 12.240 | | | | |
| $r_7$ −213.644 | $d_7$ 6.0 | $n_4$ 1.516 | $\nu_4$ 64.12 | $L_{21}$ | $G_2$ |
| $r_8$ 9.485 | $d_8$ 2.0 | $n_5$ 1.805 | $\nu_5$ 25.36 | $L_{22}$ | |
| $r_9$ −12.352 | | | | | |

20. A telecentric rear converter mountable on the image side of a telecentric objective lens for making the composite focal length of said rear converter and said objective lens greater than the focal length of said objective lens, comprising:
a first lens unit of a negative refractive power for converting a convergent light beam from said objective lens into a substantially parallel light beam, the first lens unit having a negative meniscus lens convex toward the object side, and
a second lens unit of a positive refractive power disposed rearwardly of said first lens units for converting the substantially parallel light beam from said first lens unit into a convergent light beam and forming an image at a predetermined back focal length position that is of a size different from the size of an image from said objective lens, the second lens unit having a diverging surface on the object side and a converging surface on the image side,
said two lens units being disposed so that the spacing between the principal points thereof is substantially equal to the difference between the respective absolute values of the focal lengths of said two lens units,
wherein when said rear converter is mounted on the image side of a telecentric objective lens, a composite system of the rear converter and the telecentric objective lens substantially maintains its telecentricity.

21. A telecentric rear converter according to claim 20, satisfying the following conditions:

$$0.7 < \frac{a}{|f_1|} < 1.2$$

-continued $$0.7 < \frac{f_2}{m + |f_1|} < 1.5$$

$$0.8\beta < \frac{f_2}{|f_1|} < 1.4\beta$$

where $f_1$ and $f_2$ are the focal length of said first lens unit and said second lens unit, respectively, $\beta$ is the magnification of said rear converter, m is the spacing between the principal points of said first and second lens units, and a is the distance between the image point by said objective lens and the principal point of said first lens unit when said rear converter has been mounted on said objective lens.

22. A telecentric rear converter according to claim 21, wherein said second lens unit includes at least one positive meniscus lens having a concave surface toward the object side and a convex surface toward the image side, the concave surface forming said diverging surface and the convex surface forming said converging surface.

* * * * *